United States Patent [19]

Calle et al.

[11] 4,070,704
[45] Jan. 24, 1978

[54] AUTOMATIC RECONFIGURATION APPARATUS FOR INPUT/OUTPUT PROCESSOR

[75] Inventors: Jaime Calle, Glendale; Robert J. Garvey, Phoenix; Earnest M. Monahan, Phoenix; George L. Parris, Phoenix; Jerome J. Twibell, Phoenix; John M. Woods, Glendale, all of Ariz.

[73] Assignee: Honeywell Information Systems Inc., Waltham, Mass.

[21] Appl. No.: 686,975

[22] Filed: May 17, 1976

[51] Int. Cl.² .................. G06F 11/00; G06F 13/00
[52] U.S. Cl. ........................................... 364/200
[58] Field of Search ................ 340/172.5; 445/1; 364/200, 900

[56] References Cited
U.S. PATENT DOCUMENTS

| | | |
|---|---|---|
| 3,386,082 | 5/1968 | Stafford et al. ............... 340/172.5 |
| 3,503,048 | 3/1970 | Avsan et al. .................. 340/172.5 |
| 3,680,052 | 7/1972 | Arulpragasam et al. ........ 364/200 |
| 3,787,816 | 1/1974 | Hauck et al. .................. 340/172.5 |
| 3,792,439 | 2/1974 | Auspurg et al. ............... 340/172.5 |

*Primary Examiner*—Harvey E. Springborn
*Attorney, Agent, or Firm*—Nicholas Prasinos; Ronald T. Reiling

[57] ABSTRACT

An automatic reconfiguration hardware capability for automatically altering the local memory/processor configuration and reinitiating a bootload sequence in the event of a failure in the start-up phase of the input/output processor bootload. The automatic reconfiguration logic is enabled when a bootload request originates from the system console or the central system. Once a bootload request is initiated, all possible local memory/input-output processor (IOPP) configurations are attempted without further manual intervention. If no configuration is successful, a bootload error indication is presented at the IOP configuration panel.

4 Claims, 9 Drawing Figures

AUTOMATIC RECONFIGURATION APPARATUS FOR INPUT/OUTPUT PROCESSOR

RELATED APPLICATIONS

The following patent applications filed in the U.S. Patent and Trademark Office on the date indicated thereon and assigned to the same assignee as the instant application are hereby incorporated by reference to this application.

A. "Processor for Input/Output Processing System", invented by M. G. Porter, et al, having U.S. Ser. No. 562,317, and filed in the U.S. Patent and Trademark Office on 3/26/75 now U.S. Pat. No. 3,976,977.

B. "Hardware Interrupt Mechanism", invented by E. M. Monahan, et al, having U.S. Ser. No. 562,315, and filed in the U.S. Patent and Trademark Office on 3/26/75, now U.S. Pat. No. 4,011,783.

C. "Fail Soft Memory", invented by M. G. Porter, et al, having U.S. Ser. No. 562,361, and filed in the U.S. Patent and Trademark Office on 3/26/75, now U.S. Pat. No. 4,010,450.

D. "Dispatching Hardware", invented by E. M. Monahan, et al, having U.S. Ser. No. 562,314, and filed in the U.S. patent and Trademark Office on 3/26/75.

E. "Programmable Interface", invented by G. W. Patterson, et al, having U.S. Ser. No. 562,364, and filed in the U.S. Patent and Trademark Office on 3/26/75, now U.S. Pat. No. 4,006,466.

BACKGROUND OF THE INVENTION

1. Field of the Invention

This invention relates to data processing systems and more particularly to an apparatus and method for automatically reconfiguring the local-memory/processor configuration and reinitiating a bootload sequence in the event of a failure in the start phase of the input/output processor (IOP) bootload.

2. Description of the Prior Art

A "bootstrap loader" is an elementary computer program generally of very short length (many times less than 20 instructions), which initiates the loading of either the operating system programs or any other desired programs into core or transistor storage for execution. In an error-free environment, the "bootstrap loader" is placed in the main random access memory or local random access memory only once. However, the area occupied by the bootstrap loader program is generally shared with other programs such as compilers, assembly language programs, etc. and sometimes inevitably gets written over by the loaded program. In order to obviate this difficulty and avoid the necessity of reloading such programs as the operating system from the disk memory, etc. many computer systems have provided a hardware or firmware bootloader apparatus for automatically initiating the loading of any desired program. Whereas this hardware or firmware type of bootloader apparatus obviates many of the difficulties previously encountered with a software program, it does not solve the problem where the bootload apparatus encounters trouble in the system such as a faulty memory or other faults wherein the automatic bootload is unable to load the desired program into a selected random access memory, or is unable to complete the bootload for some other undetermined reason. In such cases, prior art devices require operator intervention to reconfigure the system and reinitiate the bootload. This technique can be time-consuming, particularly where more than one fault is located in reconfiguring the system.

What is needed, therefore, is automatic reconfiguration hardware to automatically alter the local-memory-processor configuration and reinitiate the bootload sequence in the event of a failure in the start phase of the local memory/IOP bootload. More particularly, this automatic reconfiguration hardware should be capable of reconfiguring the system sequentially and automatically to produce at least $(n)$ configurations without interruption when the preceding $(n-1)$ configurations have been found faulty.

OBJECTS OF THE INVENTION

It is a primary object of the invention therefore to provide improved automatic reconfiguration hardware for a general purpose computer system.

It is another object of the invention to provide a hardware capability in a computer system to automatically alter the memory/processor configuration and reinitiate a bootload sequence in the event of a failure in the start phase of the bootload operation.

It is yet another object of the invention to provide a hardware capability in the computer system to automatically provide at least $(n)$ memory/processor configurations and reinitiate the bootload sequence for at least $(n-1)$ times in the event of $(n-1)$ failures in the start phase of the bootload operation.

SUMMARY OF THE INVENTION

In accordance with the above and other objects of the invention, there is provided a hardware capability in the computer system for altering the memory/processor configuration and reinitiating the bootload sequence in the event of failure in the start phase of the bootload operation. The automatic reconfiguration logic of the invention is enabled by a bootload request which originates from a computer system console by operator intervention, or from the operating system without operator intervention. Upon the initiation of a bootload request by an operator at the console or by the operating system, the automatic reconfiguration logic will first initialize the computer system to a known state and automatically try to bootload, one after the other, all possible memory/processor configurations without operator intervention until a bootload is successful with one configuration, or until all possible configurations have been attempted without success. If no configuration is successful, a bootload error indication is presented at the computer system configuration panel, whereupon further corrective action may be necessary by the operator.

DESCRIPTION OF THE PREFERRED EMBODIMENT OF THE INVENTION

Figure 1:
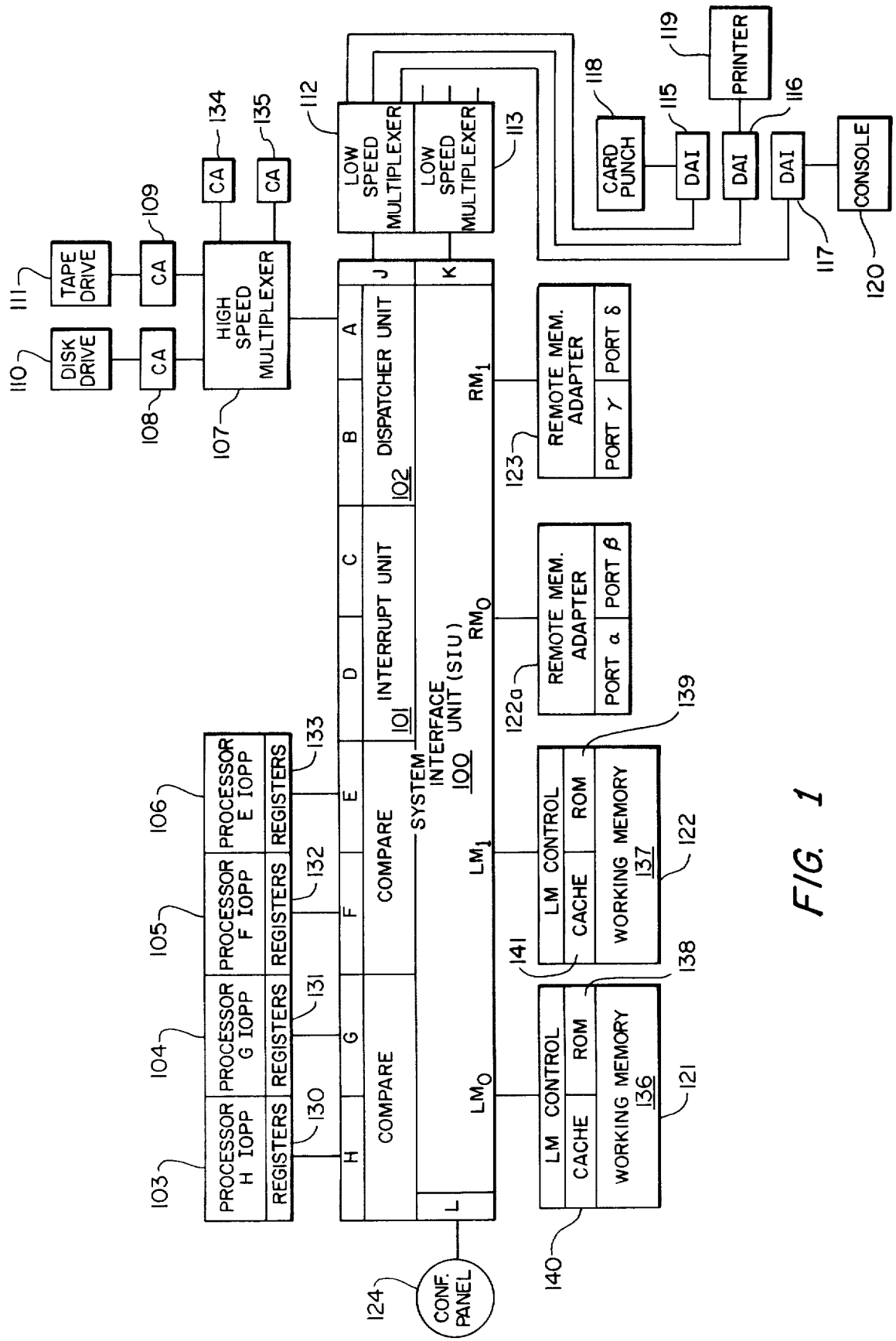
FIG. 1 is a schematic block diagram of a typical computer system utilizing the invention.

Referring now to FIG. 1 there is shown a typical computer system utilizing the invention. (The background system is described in detail in the above referenced U.S. applications incorporated herein by reference). The System Interface Unit (SIU) 100, containing the priority interrupt and dispatcher unit mechanisms 101 and 102 respectively, provides connections between the elements of the computer processing system.. The SIU 100 provides access to local memories 121 and 122, and remote memories 122a and 123 for the active module processors 103-106 and the configuration panel 124. The SIU 100 further accommodates direct addressing of the multiplexors 107, 112 and 113 and of the control adapters 108, 109, 134 and 135 by the processors 103-106.

The interrupt unit 101 and the dispatch unit 102 control the interrupt discipline and perform processor dispatching as required.

Each processor 103-106 typically contains 16 registers 130-133 for each level of priority assigned to a processor or a total of 128 processor registers capable of storing 128 words. (These registers are sometimes referred to in this specification as the scratchpad memory). Each processor is a general purpose computer processor with a conventional complement of register-register, register-memory, immediate, branch, bit field and shift instructions. These processors may be used as input/output processors (IOPP) whose functions include initiation and termination of I/O command sequences, fetching, checking and translating channel programs, and direct control of low-speed peripheral devices such as unit record and data communications equipment. Processors 103-106 are attached to and communicate with the SIU 100 via interface ports H, G, F and E respectively.

The processors 103-106 communicate with the local memories 121, 122 via the interface unit (SIU) and ports LM0 + LM1. Each of the local memories 121, 122 is organized as a read-write store 136, 137 respectively, plus read only memory (ROM) 138, 139, with an optional cache memory 140, 141. Widths of the local memory interface $LM_0$, $LM_1$ is 36 bits plus 4 bits for parity. Local memory size is typically 256K or 512K bytes wherein each K is equal to 1024 bytes.

The remote memory adapters 122a, 123 are utilized when the SIU with its processors and peripherals are part of a larger general purpose computer system. The Remote Memory Adapters (REMA) 122a, 123, then provide a means for exchanging control and data transfers between the processors 103-106 and a Central System Interface Unit of the larger general purpose computer system not shown herein. Up to two ports alpha, betta, gamma, and delta for each of the REMA units 122a, 123 respectively are provided, each port having a 40-bit data path for input and 40-bit for output between the computer system shown and described herein and a larger computer system not shown herein. The REMA units 122a, 123 are connected and communicate with the SIU 100 via interface ports $RM_0$ and $RM_1$.

A high-speed multiplexor 107 provides direct control of data transfers between high-speed peripheral devices (disk drive 110, tape drive 111) and remote memory 122a, 123 or local memory 121, 122. The high-speed multiplexor 107 interfaces between the SIU and the peripherals via ports A-F.

Each low-speed multiplexor 112, 113 permits direct control by a processor 103-106 of a low-speed device such as card punch 118, printer 119 and console 120 via interface ports J and K and device adapter interface unit DAI 115, 116 and 117 respectively.

(For a detailed discussion of the above background computer system, reference should be made to the above identified applications incorporated by reference herein).

Figure 2A:
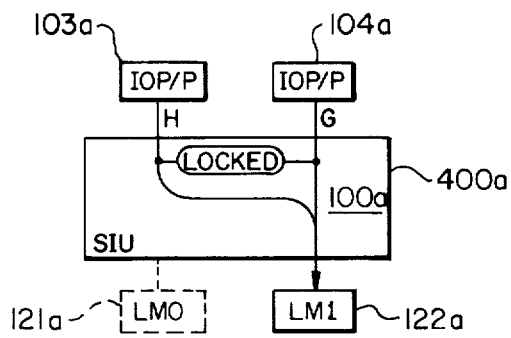
FIGS. 2a-2f are schematic block diagrams of various processor/memory configurations that the invention is capable of automatically reconfiguring.
Figure 2B:
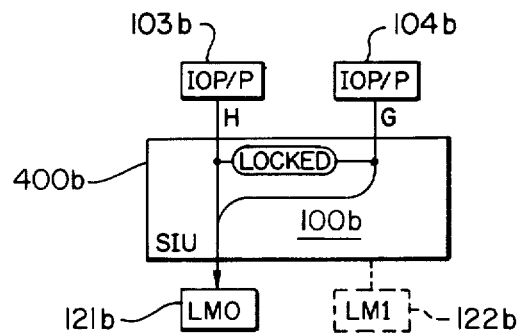
Figure 2C:
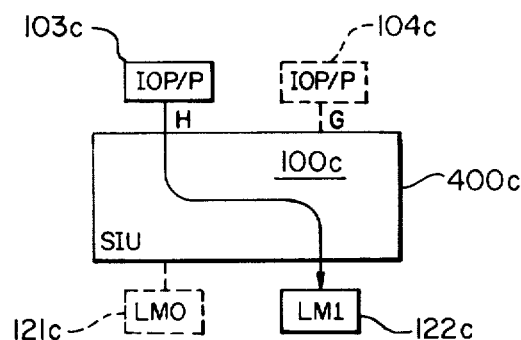
Figure 2D:
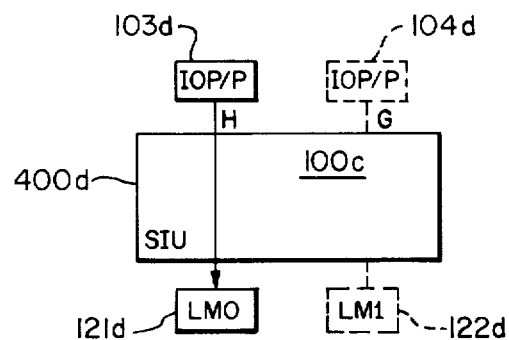
Figure 2E:
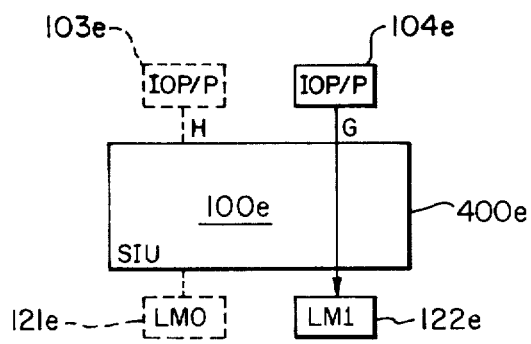
Figure 2F:
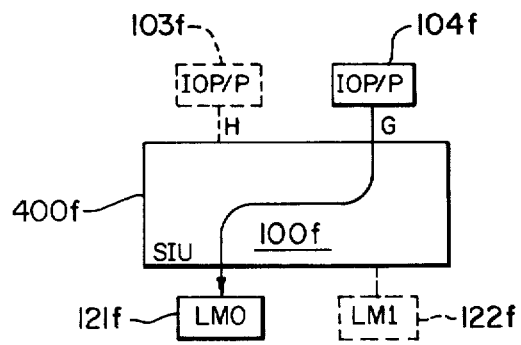

Referring now to FIGS. 2a--2f there is shown in block diagram format various configurations that the invention may automatically assume for the automatic boot loading of either the operating system programs or any other desired program for the memory selected. Referring more particularly to FIG. 2a there is shown a first configuration of FIG. 1 wherein IOP/P processors 103a and 104a are in a locked mode operating as a locked pair. (It should be noted that only the essential elements are shown on FIG. 2a and identified by the same reference numerals as on FIG. 1 with the exception that the "a" has been added in each of the reference numerals in order to indicate that it belongs to the configuration of FIG. 2a). Hence the IOP/P 103a of FIG. 2a corresponds to the IOP processor 103 of FIG. 1. System interface unit (SIU) 100a of FIG. 2a corresponds to system interface unit 100 of FIG. 1. The IOP/P processor 104a of FIG. 2a corresponds to the IOP processor 104 of FIG. 1. Local memory (LM1) 122a of FIG. 2a corresponds to local memory 122 attached to port LM1 of FIG. 1. Local memory (LM0) 121a of FIG. 2a is shown dotted because it does not participate in the configuration of FIG. 2a, but there is a correspondence to local memory 121 attached to port LM0 of FIG. 1. Similar correspondence with FIG. 1 will be found for the remaining FIGS. 2b-2f. In Figures 2c-2f, the processors are illustrated in an unlocked mode wherein each processor executes individually. Block 400 of each of FIGS. 2a-2f is the reconfiguration logic illustrated in FIG. 4.

It should be noted that the configurations of FIGS. 2a-2f have included processors 103 and 104 attached to ports H and G of the SIU 100. This configuration of processors 103 and 104 are designated as processor pair 0 or simply a processor 0. (See FIG. 4 reference numeral 411 which is the 4 bit counter for processor number 0). It should be understood that similar configurations as those shown in FIGS. 2a-2f are also possible utilizing processors 105 and 106 attached to ports F, E of SIU 100. (See FIG. 4 reference numeral 410 which is the 4 bit counter for the configuration for those IOP processors attached to ports E and F respectively and designated as processor number 1).

Figure 3:
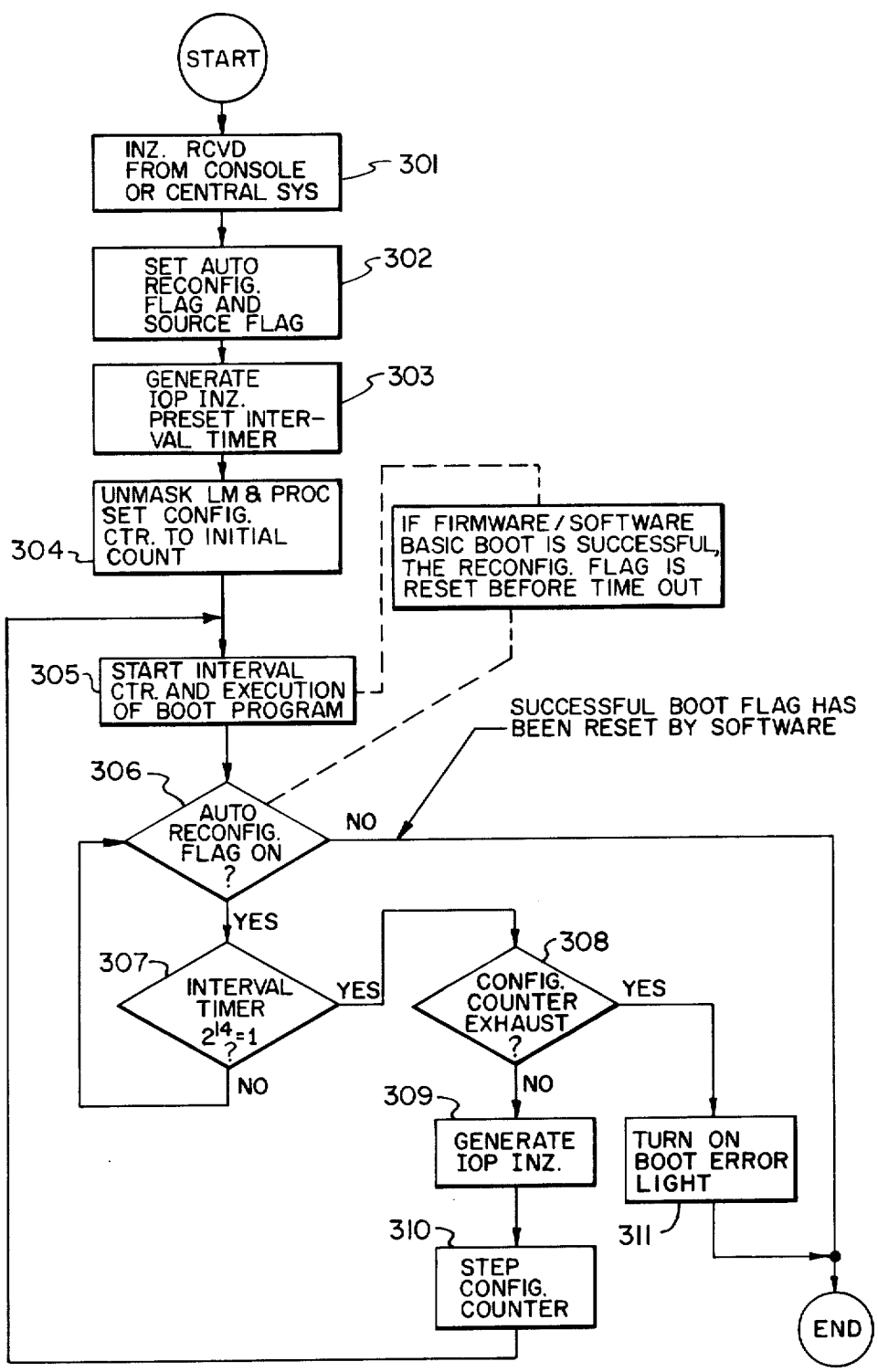
FIG. 3 is a flow diagram of the automatic reconfiguration sequence that the invention is capable of performing.
Figure 4:
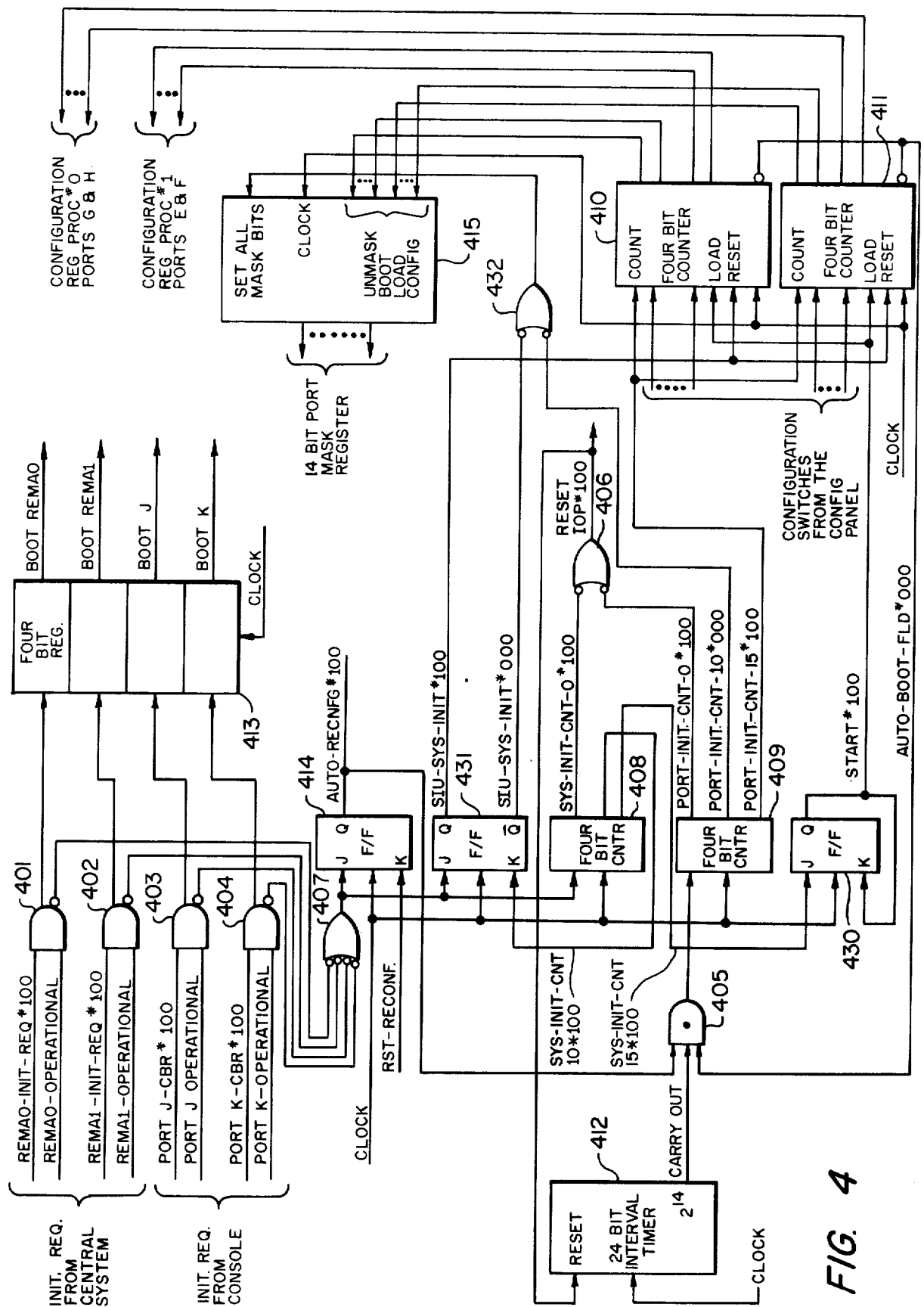
FIG. 4 is a schematic logic block diagram of the invention.

Referring now to FIG. 3 there is a flow chart of the operation performed by the invention. The automatic reconfiguration apparatus is started when it receives an initialize request signal from either a console or central computer system, and also receives an operational signal from the unit making the request. (See block 301). The operational signal indicates that the unit making the request is physically in place, that power is applied to it, and that the port coupling the requesting unit to the system interface unit (SIU) 100 is unmasked. The OR'ed output of these request signals are then applied to set the automatic reconfiguration flag which is flip-flop 414 on FIG. 4. With this reconfiguration flag set (i.e. the Q output terminal of flip-flop 414 is high) the system assumes the reconfiguration mode. The AND'ed initialize request signal and operational signal is then applied to the 4 bit register 413 indicating the unit making the initialized request. (See block 302). The next step (block 303) is to generate an IOP initialize signal via OR gate 406 and reset the entire system including the interval timer 412. (Details of these operations will be discussed in greater detail infra). The IOP initialize signal is generated via 4 bit counter 408 and OR gate 406. Normally 4 bit counter 408 is in the count zero state and remains in that state until it is triggered by an external signal, whereupon it steps through 16 consecutive counts responsive to each clock signal until it returns to its initial count zero state where it is once again disabled and remains there until the next initiating signal. (It should be noted by referring to FIG. 4 that the SYS-INT-CNT-0*100 signal from the 4 bit counter is true when the signal is high. This is because of the convention adopted on FIG. 4 whereby an asterisk is followed by 3 digits generally 000 or 100. If the first digit after the asterisk is a zero, it indicates that the statement is true when the signal is low whereas when the first digit following the asterisk is a 1 it indicates that the statement is true when the signal is high). Accordingly, the IOP initialize signal is generated on count 0 when 4 bit counter 408 is low; this signal is inverted through OR gate 406 to generate the IOP initialize signal. The IOP initialize signal is applied to the IOP unit (not shown) to initialize it to a known state and also it is applied to the 24 bit interval counter 412 to reset it. Finally the last operation (block 304) is initializing the configuration apparatus of FIG. 4 is to unmask the ports for a selected local memory and IOP processor configuration. This is done on the 15th count of 4 bit counter 408 to be discussed infra. It has previously been shown that the output signal generated in OR/NOR gate 407 in addition to being applied to flip-flop 414 is also applied to 4 bit counter 408 to commence one cycle of 16 counts. This same signal is also applied to the J terminal of JK flip-flop 431 to generate on the Q output terminal of flip-flop 431 a high signal SIU-SYS-INIT*100. This high signal is applied to each of the 4 bit counters 410 and 411 to reset them to an initial state. The SIU-SYS-INIT signal is also used to set all 14 mask bits on in the port mask register through OR gate 432. When 4 bit counter 408 reaches count 10 (decimal) a high signal SYS-INIT-CNT-10*100 is generated and applied to the K terminal of JK flip-flop 431 to reset the Q output terminal to a low state. This removes the reset signal from configuration counters 410 and 411 respectively, thus leaving them in a cleared state so that either one may receive the configuration code for a selected initial configuration. On count 15 of 4 bit counter 408 a high signal SYS-INIT-CNT-15*100 is generated and is applied to the J terminal to set JK flip-flop 430. This generates a high signal START*100 on the Q output terminal of JK flip-flop 430. The START*100 signal is applied for one clock cycle to configuration counters 410 and 411 which permit the loading of the initial configuration code selected by an operator from the configuration panel. (It should be noted that whereas in prior art systems the operator manually selected the initial configuration he also manually selected the subsequent configurations in the event of failures of the bootload which is not the case with this invention). The next state to be set into counters 410 and 411 is available as outputs so these signals are applied to the 14 bit port mask register to unmask the initial configuration corresponding to the selected configuration of FIGS. 2a-2f of LM/I-OPP. (Port mask registers are well known in the art and store a selected code, which can be applied to individual ports to select any one of the configurations of FIGS. 2a-2f). When this state is reached the automatic configuration apparatus is initialized and ready to perform its first bootload. (See block 304). As noted before, the actual bootloader is not a part of this invention and in prior art may be firmware or software.

The actual bootload operation is timed by 24 bit interval counter 412 for a predetermined interval, and if not successful with that interval another reconfiguration is attempted and so on until all configurations have been exhausted. (See block 305). If there has been an unsuccessful bootload, the RST-RECONFIG signal is not generated and is not applied to the K terminal of JK flip-flop 414; hence JK flip-flop 414 is not reset. Accordingly, the automatic reconfiguration flag is still on and a high signal is applied to an input terminal of AND gate 405. (See decision block 306). Moreover, since the 24 bit interval timer 412 has timed out (i.e. bit $2^{14}$ has been reached) a carry out signal is generated and it too is also applied to another input terminal of AND gate 405. However, it will be seen that since this was the first configuration attempted, configuration registers 410 and 411 still have the initial reconfiguration code and have not been stepped through any additional reconfigurations and accordingly there is at least one IOPP still configured for processor zero or processor one. Therefore, the AUTO-BOOT-FLD*000 signal from configuration counters 410 and 411 is in the high state and is applied to a third input terminal of AND gate 405. (See decision blocks 307 and 308). With all input terminals of AND gate 405 high a high signal is generated at its output terminal and applied to 4 bit port initialize counter 409. (It should be noted that 4 bit counter 409 is similar to 4 bit counter 408, but whereas 4 bit counter 408 was utilized in the first stages of the configuration apparatus, 4 bit counter 409 will now be utilized in the reconfiguration stages of the configuration apparatus of FIG. 4). Hence on the zero count a low output signal PORT-INIT-CNT-0*100 is generated and applied to OR gate 406 where it is inverted and a high IOP reinitialize signal is generated. (See block 309). This IOP reinitialize signal which was previously generated by 4 bit counter 408 and now is generated by 4 bit counter 409 is also applied to the IOP unit (not shown) and to 24 bit interval counter 412 to reset it. As was previously done with counter 408. Counter 409 is also stepped through 16 counts and then it stops at the zero count until reinitialized again. At count 10, the signal PORT-INIT-CNT-10*000 is OR'ed at gate 432 and applied to the port mask register to make all 14 ports. On count 15 of 4 bit counter 409 a high PORT-INIT-CNT-15*100 signal is generated which is applied to configuration counters 410 and 411 to decrement the count by 1. When this count is decremented by 1, a different code than the initial code first applied from the configuration panel is now generated simply because the count has been decremented. The next state outputs from counters 410 and 411 are used to unmask the new configuration in the port mask register 415 at PORT-INIT-CNT-15*100 time. (See block 310). A second bootload is then performed. If this is successful, then a RS-RECONFIG signal is generated and applied to the K terminal to reset JK flip-flop 414 thus causing the Q output terminal of flip-flop 414 to become low and thus disabling AND gate 405 and terminating the reconfiguration bootmode. However, if the second bootload is not successful, AND gate 405 remains enabled and the reconfiguration cycle is repeated until finally after all attempts to bootload have been unsuccessful and the nth bootload has been reached, the AUTO-BOOT-FLD*000 decode from one of the 4 bit counters 410 and 411 goes low which disables AND gate 405. At the same time a high boot error signal is generated which is applied to a boot error light on configuration panel 124. (See block 311).

Having thus far discussed the operational details of FIG. 4 with reference to FIG. 3, the structural details will now be discussed.

Referring to FIG. 4 there is shown 4 AND/NAND gates 401-404. Each gate is coupled to appropriate requesting units of the computer system of FIG. 1 to receive an initialize request signal and an operational signal on its input terminal. The non-inverted output terminals of AND gates 401-404 are coupled to a 4 bit register 413 with each output terminal of each AND gate being applied to separate input bit terminals. The inverted output signals from AND/NAND gates 401-404 are coupled to the inverted input terminals of OR/NOR gate 407. The output terminal OR/NOR gate 407 is coupled to the J input terminal of JK flip-flop 414, to the J input terminal of JK flip-flop 431, and also the input terminal of 4 bit counter 408. The Q output terminal of flip-flop 414 is coupled to an input terminal of AND gate 405. The count zero terminal of 4 bit counter 408 is coupled to OR gate 406. The output terminal of count number 10 of 4 bit counter 408 is coupled to the K reset terminal of JK flip-flop 431. The Q output terminal of JK flip-flop 431 is in turn coupled to the reset terminals of 4 bit counters 410 and 4111. The Q output terminal of JK flip-flop 431 is coupled to an input of OR gate 432. The output terminal of OR gate 432 is coupled into the clear input of the port mask register 415. The output terminal for count 15 of 4 bit counter 408 is coupled to the J set terminal of JK flip-flop 430. The Q output terminal of JK flip-flop 430 is coupled to the load terminals of 4 bit counters 410 and 411. The output terminal of OR gate 406 is coupled to the IOP unit (not shown)) and also to the reset terminal of 24 bit counter 412. The carry out terminal of 24 bit counter 412 is coupled to an input terminal of AND gate 405; whereas the inverted output terminals of 4 bit counters 410 and 411 are coupled to another input terminal of AND gate 405. The output terminal of AND gate 405 is coupled to a count input terminal of 4 bit counter 409. The count zero output terminal of 4 bit counter 409 is coupled to an inverter input terminal of OR gate 406. The count 10 output terminal of 4 bit counter 409 is coupled to an inverted input of OR gate 432. The count 15 output terminal of 4 bit counter 409 is coupled to the count decrement terminal of 4 bit counters 410 and 411. There is also input terminals on 4 bit counters 410 and 411 to receive an initial configuration code from configuration panel. Also on 14 bit register 415 (the port mask register) there are input terminals to also receive a configuration code from configuration counters 410 and 411.

With respect to the elements utilized in this apparatus, it should be noted that they are well known in the computer art and commercially available. Most of these items are available from Texas Instruments Inc. of Dallas, Texas and other manufacturers as of May 17, 1976. For example, AND gates 401-404, 406 and 405 are available from Texas Instruments Corporation and designated TI7400. OR/NOR gate 407 is of the TI7420 type. Counters 408-412 are of the TI74161 type. Registers 413 and 415 and flip-flops 414, 430 and 431 are of the TI740107 type.

Having shown and described a preferred embodiment of the invention, those skilled in the art will realize that many variations and modifications may be made to effect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. In a computer system including a system interface unit coupled to plural processors, plural main memories, a peripheral unit for storing computer programs, an interval timer and a computer program bootload apparatus, the combination which comprises:
   a. first logic means responsive to a system initialization request for issuing a reconfiguration signal during a start-up phase of a system initialization;
   b. second logic means responsive to said signal and to an extrasystem configuration code for selecting a first configuration of said plural memories and said plural processors to accommodate a computer program bootload; and
   c. third logic means in electrical communication with said first means, said second means and said interval timer for automatically reinitializing said system and selecting one of plural successive configurations of said plural memories and said plural processors in the event said bootload is not completed within a preset time interval.

2. In a computer system including a system interface unit coupled to plural processors, plural main memories, a peripheral unit for storing computer programs, an interval timer and a computer program bootload apparatus, the combination which comprises:
   a. first logic means responsive to either intrasystem or extrasystem initialization requests for providing a first logic state indicating a system reconfiguration condition during a start-up phase of a system initialization;
   b. second logic means responsive to said first logic state for selecting one of said plural memories and one of said plural processors to initialize a bootload sequence wherein a computer program stored in said peripheral unit is loaded into said one of said plural memories for execution by said one of said plural processors; and
   c. third logic means in electrical communication with said first and said second logic means for automatically and sequentially selecting (n) different configurations of said plural memories and said plural processors in the event of (n) failures to load said computer program within a preset time interval.

3. The combination set forth in claim 2 including fourth logic means for resetting said first logic means to a second logic state in the event said bootload sequence is completed within said preset time interval.

4. A reconfiguration system for controlling the flow of information between plural processors and plural memory units in a computer system having peripheral information storage means, which comprises:
   a. system initialization logic means responsive to an initialization request signal for setting a reconfiguration mode flag;
   b. logic reset means responsive to said flag for placing said reconfiguration system in an initial logic state;

c. control counter means in electrical communication with said logic reset means and said system initialization means for providing configuration control signals to address selected ones of said plural processors and said plural memories;

d. mask register means in electrical communication with said logic reset means and said control counter means for routing information signals between said plural processors and said plural memories in accordance with said control signals;

e. an interval timer in electrical communication with said logic reset means for indicating the expiration of a preset time interval; and f. reinitialization counter means in electrical communication with said interval timer means, said system initialization logic means and said control counter means for initiating successive bootload operations and controlling the selection of successive communication paths between said plural processors and said plural memories.

* * * * *